United States Patent
Lim et al.

(10) Patent No.: US 8,279,923 B2
(45) Date of Patent: Oct. 2, 2012

(54) VIDEO CODING METHOD AND VIDEO CODING APPARATUS

(75) Inventors: Chong Soon Lim, Singapore (SG); Viktor Wahadaniah, Singapore (SG); Teo Han Boon, Singapore (SG); Toshiyasu Sugio, Osaka (JP); Takahiro Nishi, Nara (JP); Youji Shibahara, Osaka (JP); Kazuya Takagi, Osaka (JP)

(73) Assignee: Panasonic Corporation, Osaka (JP)

( * ) Notice: Subject to any disclaimer, the term of this patent is extended or adjusted under 35 U.S.C. 154(b) by 1054 days.

(21) Appl. No.: 12/026,729

(22) Filed: Feb. 6, 2008

(65) Prior Publication Data

US 2008/0192824 A1 Aug. 14, 2008

(30) Foreign Application Priority Data

Feb. 9, 2007 (JP) .................................. 2007-031155

(51) Int. Cl.
*H04N 7/12* (2006.01)

(52) U.S. Cl. ......... 375/240.03; 375/240.01; 375/240.18; 375/240.02

(58) Field of Classification Search .................. 375/146, 375/147, 239, 240, 240.01, 240.02, 240.04, 375/240.05, 240.06, 240.07, 240.08, 240.09, 375/240.1, 240.12, 240.13, 240.14, 240.15, 375/240.16, 240.18, 240.2, 240.22, 240.23, 375/240.27, 243, 245, 240.03; 382/236, 382/238, 251, 253, 232, 239, 275; 348/400.1, 348/231.99, 333.13, 402.1, 700

See application file for complete search history.

(56) References Cited

U.S. PATENT DOCUMENTS

| | | | | |
|---|---|---|---|---|
| 5,251,028 A * | 10/1993 | Iu | ................................. | 348/400.1 |
| 5,724,097 A * | 3/1998 | Hibi et al. | ................. | 375/240.04 |
| 5,978,515 A * | 11/1999 | Katata et al. | ................... | 382/243 |
| 6,249,614 B1 * | 6/2001 | Kolesnik et al. | ............... | 382/251 |
| 6,389,072 B1 * | 5/2002 | Tzou et al. | ..................... | 375/240 |
| 6,404,933 B1 * | 6/2002 | Yamamoto | ..................... | 382/251 |
| 6,782,135 B1 * | 8/2004 | Viscito et al. | .................. | 382/239 |
| 7,317,759 B1 * | 1/2008 | Turaga et al. | ............. | 375/240.01 |
| 7,653,130 B2 * | 1/2010 | Joyce et al. | ................. | 375/240.07 |
| 7,697,783 B2 * | 4/2010 | Lee et al. | ........................ | 382/275 |
| 7,856,054 B1 * | 12/2010 | Kasarabada et al. | ...... | 375/240.03 |
| 2002/0003576 A1 * | 1/2002 | Konishi et al. | ................ | 348/232 |
| 2002/0024999 A1 * | 2/2002 | Yamaguchi et al. | ...... | 375/240.03 |
| 2002/0094031 A1 | 7/2002 | Ngai et al. | | |

(Continued)

FOREIGN PATENT DOCUMENTS

JP 3-129981 6/1991

(Continued)

*Primary Examiner* — Abdullah Riyami
(74) *Attorney, Agent, or Firm* — Wenderoth, Lind & Ponack, L.L.P.

(57) ABSTRACT

A method and an apparatus are provided for adaptively improving an image quality of current images to be coded by reducing effects due to pulsing artifacts. The video coding method is intended for coding a video on a per predetermined block basis using one or more predetermined quantization control variables. The method includes calculating a correlation degree indicating a correlation between an original block in a current original picture to be coded and a prediction block in a previous uncompressed picture, and includes changing a first predetermined quantization control variable to a second predetermined quantization control variable, so as to reduce a quantization step size when the correlation degree is greater than a predetermined threshold. The method also includes determining the quantization step size based on the second quantization control variable, and coding the original block based on the determined quantization step size using a predetermined image coding tool.

10 Claims, 9 Drawing Sheets

U.S. PATENT DOCUMENTS

| | | | |
|---|---|---|---|
| 2002/0181583 A1* | 12/2002 | Corbera | 375/240.03 |
| 2003/0012444 A1* | 1/2003 | Inoue et al. | 382/232 |
| 2003/0113027 A1* | 6/2003 | Chan et al. | 382/240 |
| 2003/0128761 A1* | 7/2003 | Zhou | 375/240.16 |
| 2003/0227970 A1* | 12/2003 | Fert et al. | 375/240.03 |
| 2004/0202248 A1 | 10/2004 | Boroczky et al. | |
| 2004/0234144 A1* | 11/2004 | Sugimoto et al. | 382/239 |
| 2005/0100229 A1* | 5/2005 | Becker et al. | 382/232 |
| 2005/0111742 A1 | 5/2005 | Seo | |
| 2005/0213657 A1* | 9/2005 | Kodama et al. | 375/240.03 |
| 2005/0259734 A1* | 11/2005 | Hellman | 375/240.16 |
| 2006/0159165 A1 | 7/2006 | Lu | |
| 2006/0188021 A1* | 8/2006 | Suzuki et al. | 375/240.16 |
| 2006/0268990 A1* | 11/2006 | Lin et al. | 375/240.24 |
| 2007/0061138 A1* | 3/2007 | Chen et al. | 704/230 |
| 2007/0171978 A1 | 7/2007 | Chono | |
| 2007/0206679 A1* | 9/2007 | Lim et al. | 375/240.18 |
| 2007/0217506 A1* | 9/2007 | Yang et al. | 375/240.03 |
| 2007/0237232 A1* | 10/2007 | Chang et al. | 375/240.16 |
| 2008/0015850 A1* | 1/2008 | Chen et al. | 704/223 |
| 2008/0084491 A1* | 4/2008 | He et al. | 348/333.13 |
| 2008/0089597 A1* | 4/2008 | Guo et al. | 382/238 |
| 2009/0067493 A1* | 3/2009 | Jun et al. | 375/240.03 |
| 2010/0020872 A1* | 1/2010 | Shimizu et al. | 375/240.12 |
| 2010/0074338 A1* | 3/2010 | Yamori et al. | 375/240.16 |
| 2011/0019737 A1* | 1/2011 | Yang et al. | 375/240.03 |
| 2011/0038418 A1* | 2/2011 | Pandit et al. | 375/240.16 |

FOREIGN PATENT DOCUMENTS

| | | |
|---|---|---|
| JP | 6-125542 | 5/1994 |
| JP | 7-255052 | 10/1995 |
| JP | 2712646 | 10/1997 |
| JP | 10-341436 | 12/1998 |
| JP | 2000-078577 | 3/2000 |
| JP | 2004/254327 | 9/2004 |
| JP | 2005-124145 | 5/2005 |
| JP | 2006-516072 | 6/2006 |
| WO | 2004/036501 | 4/2004 |
| WO | 2004/077810 | 9/2004 |
| WO | 2006/070614 | 7/2006 |

* cited by examiner

VIDEO CODING METHOD AND VIDEO CODING APPARATUS

BACKGROUND OF THE INVENTION (1) Field of the Invention

The present invention relates to a coding technique for coding multimedia data, and in particular to a video compression coding technique by intra-predictive coding.

(2) Description of the Related Art

In general, most video coding algorithms, such as the ISO/IEC 14496-2 Part 10 International Standard, code an intra-picture, which is also known as a key picture, at the start of each group of consecutive inter-predicted pictures. An intra-coded picture is a self-contained picture which does not depend on neighbouring pictures to be decoded. The intra-coded picture is sometimes used as an access point for a video decoder to independently decode a specific group of pictures (GOP) which includes the intra-picture and the inter-predicted pictures following the intra-coded picture without causing the decoder to decode pictures prior to the intra-coded picture in the compressed video stream. A coded video sequence is sometimes made up of several groups of pictures to facilitate random access and decoding of a portion of the coded video sequence.

Figure 1:
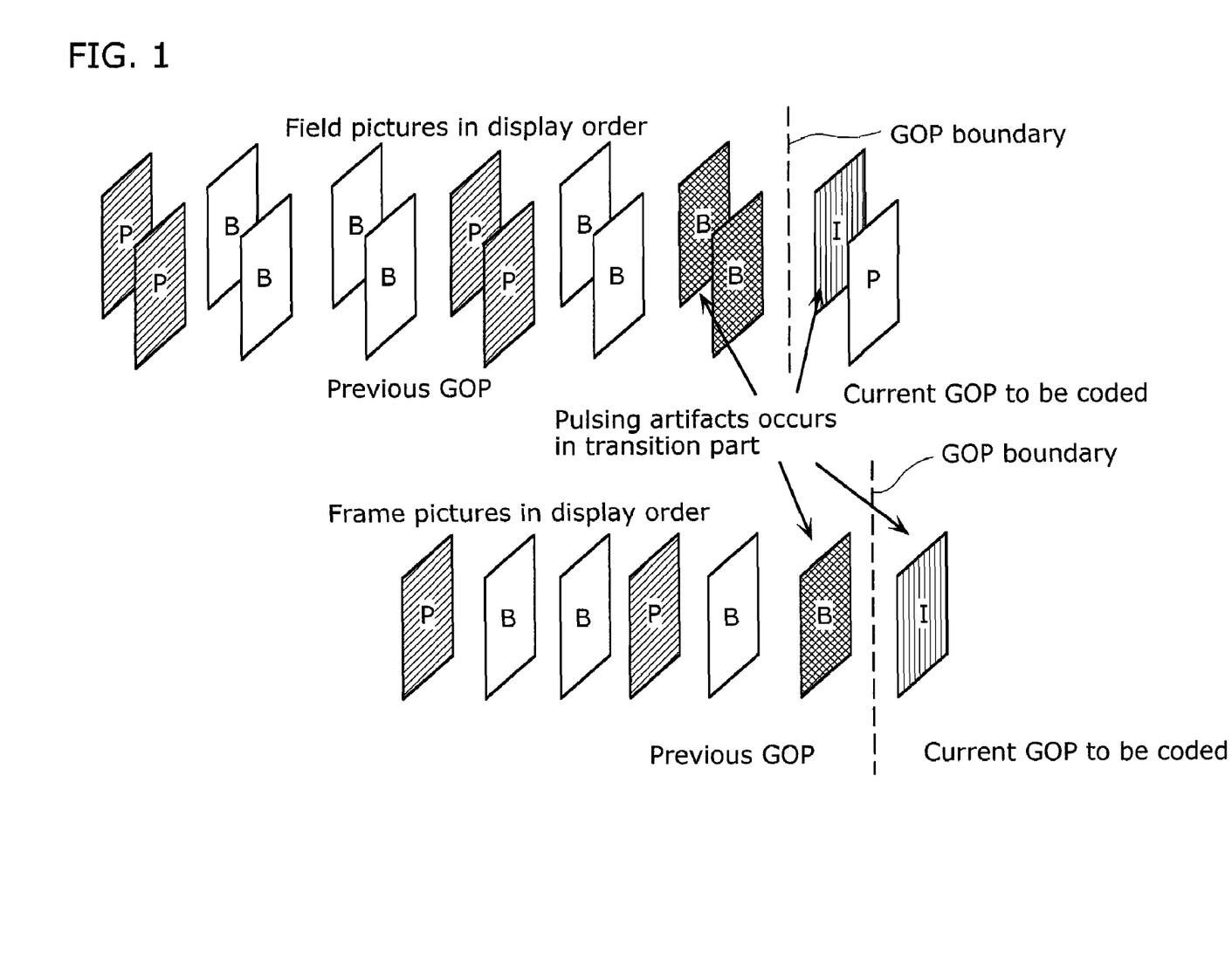
FIG. 1 is a diagram illustrating an example of pulsing artifacts in a coded video sequence.

The "pulsing" effect is an artifact that occurs when the coded quality of an intra-picture is different from the inter-pictures coded prior to the intra-picture. In another words, this artifact occurs at the transition part of one group of pictures to another group of pictures. For a coded video sequence that is made up of groups of pictures, this artifact appears like a "pulse" at every group of pictures interval due to a different intra-picture quality. The pulsing effect is more noticeable at a region of a picture with small motion activities especially in the case where the video sequence is coded at very high compression rate. FIG. 1 shows some examples of where pulsing artifacts occur in a video sequence. As shown in the figure, pulsing artifacts occurs at the GOP boundary between two different GOPs.

To reduce this pulsing effect, one prior art is to use a rate control algorithm to control the quality of the intra-picture and to modify bit rates at only GOP boundaries (See Japanese unexamined Patent Application Publication No. 2000-78577 for example). This pulsing effect is usually caused when the intra-picture is over compressed. Thus, one method to reduce this pulsing effect is to reduce the compression ratio for the whole intra-picture while increasing the compression ratio for the inter-pictures. However, the problem with this method is that the quality of the inter-pictures is reduced due to the higher compression ratio which results in the increase of other artifacts such as blocking, ringing, and the like.

Pulsing effect is a noticeable artifact which occurs in a video compressed at a high compression ratio using a video coding algorithm such as the ISO/IEC 14496-2 Part 10 International Standard. In order to improve the picture quality of the compressed video, this artifact needs to be reduced either prior to the coding or after the decoding of the video. The problem with the prior art, that reduces the compression ratio of the intra-picture to reduce this pulsing effect, is that in order to maintain a certain overall compression ratio within the group of pictures, the quality of the inter-pictures is reduced due to higher compression ratio. Thus, although the pulsing effect is reduced at the boundaries between the groups of pictures, the prior art introduces more artifacts to the inter-pictures within the group of pictures.

SUMMARY OF THE INVENTION

The present invention has been made to solve the problems, and aims at providing a video coding method and the like which enables reduction in the effect due to pulsing artifacts.

In order to solve the above problems, a new method is introduced for adaptively adjusting the quality of the pictures at the beginning of a group of pictures. What is novel about this invention is that this invention adaptively adjusts the quality of a picture belonging to a group of pictures based on the relationship with a macroblock of a picture belonging to a previous group of pictures. Thus, this invention adaptively adjusts the quality of some regions of a picture where pulsing artifact are more visually noticeable.

The video coding method according to the present invention is intended for coding a video on a per predetermined block basis using one or more predetermined quantization control variables. The video coding method includes: calculating a correlation degree indicating the correlation between an original block in a current original picture to be coded and a prediction block in a previous uncompressed picture; changing a first predetermined quantization control variable to a second predetermined quantization control variable so as to reduce a quantization step size in the case where the correlation degree is greater than a predetermined threshold; and determining the quantization step size based on the second quantization control variable, and coding the original block on the determined quantization step size basis using a predetermined image coding tool.

In addition, the video coding apparatus according to the present invention codes a video on a per predetermined block basis using one or more predetermined quantization control variables. The video coding apparatus includes: a correlation calculation unit which calculates a correlation degree indicating a correlation between an original block in a current original picture to be coded and a prediction block in a previous uncompressed picture; a variable determination unit which changes a first predetermined quantization control variable to a second predetermined quantization control variable so as to reduce a quantization step size in the case where the correlation degree is greater than a predetermined threshold; and an image coding unit which determines the quantization step size based on the second quantization control variable, and code the original block on the determined quantization step size basis using a predetermined image coding tool.

The advantageous effect of the present invention is to reduce pulsing artifact of a compressed video sequence especially at the transition part between two independent groups of pictures. The advantageous effect appears in the form of better visual quality.

The adaptive picture quality adjustment process can be applied to macroblocks of both intra- and inter-predicted pictures. Even in the case where the adaptive picture quality adjustment process is applied to macroblocks of an intra-predicted picture only, the pulsing artifact of the compressed video sequence can still be reduced while constraining the size increase in the intra-coded picture. This improves the overall quality of the video sequence without reducing the compression ratio of the compressed video sequence.

Note that the present invention can be also realized as a program for causing a computer to execute the steps in the video coding method. Further, such a program can be distributed through recording media such as DVDs and communication media such as the Internet.

Furthermore, the present invention can be also realized as an integrated circuit including unique functional units in the video coding apparatus.

Further Information about Technical Background to this Application

The disclosure of Japanese Patent Application No. 2007-031155 filed on Feb., 9, 2007 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

Descriptions are given of a video coding method and a video coding apparatus according to the present invention with reference to the drawings. Although only some exemplary embodiments of the present invention are described in detail below with reference to the drawings, those skilled in the art will readily appreciate that many modifications are possible in the exemplary embodiments without materially departing from the novel teachings and advantageous effects of the present invention. Accordingly, all such modifications are intended to be included within the scope of this invention.

Figure 2:
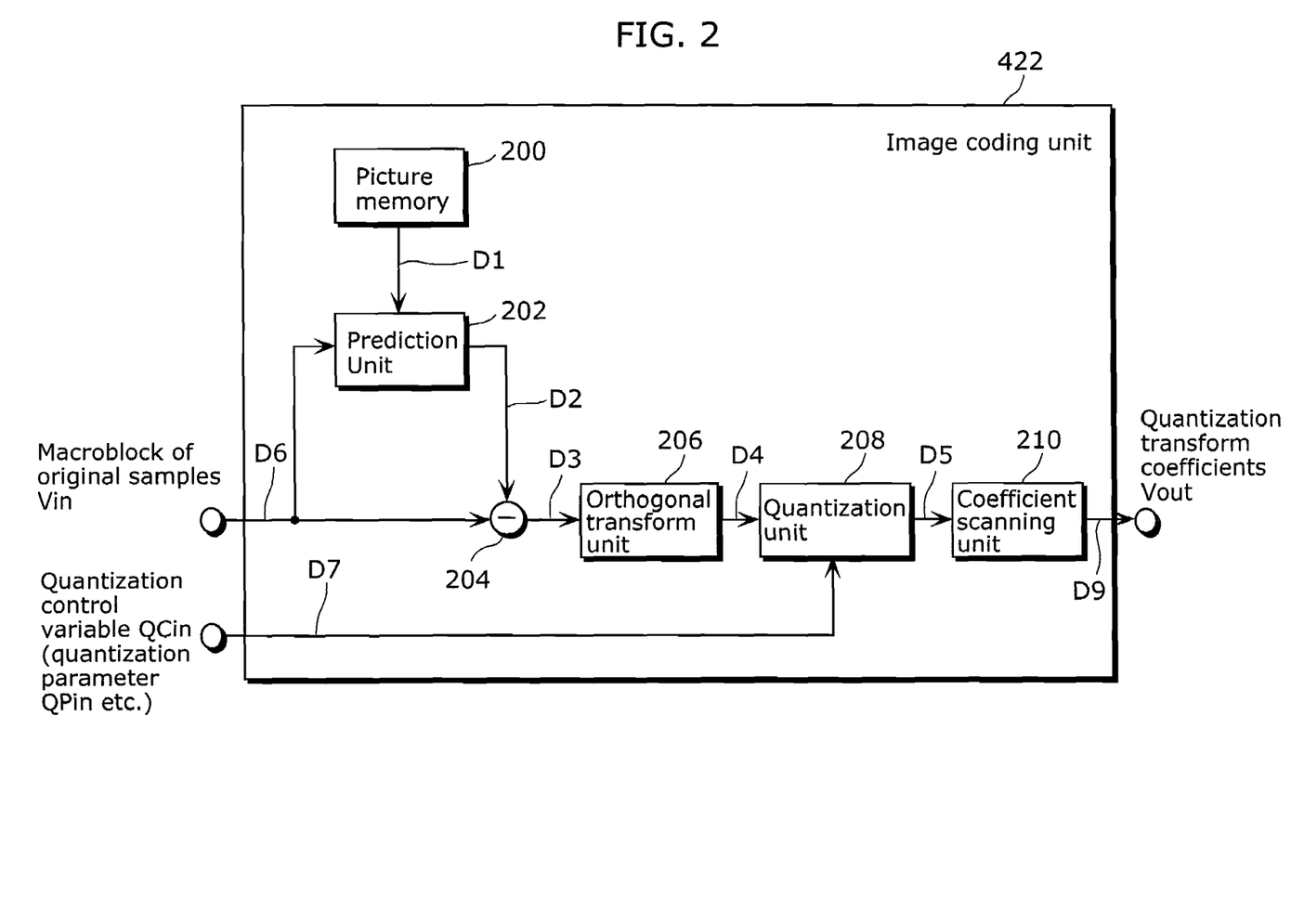
FIG. 2 is a block diagram showing an example of an image coding unit using macroblock adjustment.

FIG. 2 shows a block diagram showing a functional structure of an image coding unit in a video coding apparatus according to an embodiment of the present invention. As shown in FIG. 2, an image coding unit 422 includes a picture memory 200, a prediction unit 202, a subtractor unit 204, an orthogonal transform unit 206, a quantization unit 208, and a coefficient scanning unit 210. The quantization unit 208 controls the compression ratio of an image by quantizing the transform coefficients. The level of quantization is determined by a parameter called Quantization control variable QCin (such as a quantization parameter QPin and a quantization matrix QMin). For example, this quantization parameter is directly proportional to the quantization step size. In other words, the greater the quantization parameter value, the larger the quantization step size and thus the greater the compression ratio.

(First Embodiment)

The adaptive picture quality adjustment process performed on a video includes two steps. The first step is to determine a correlation between a current macroblock to be coded of uncompressed original samples and samples of the preceding uncompressed pictures. The next step is to improve the coding quality of the current macroblock in the case where there is a high correlation between the current macroblock of uncompressed original samples and the samples of the preceding uncompressed pictures.

Figure 3:
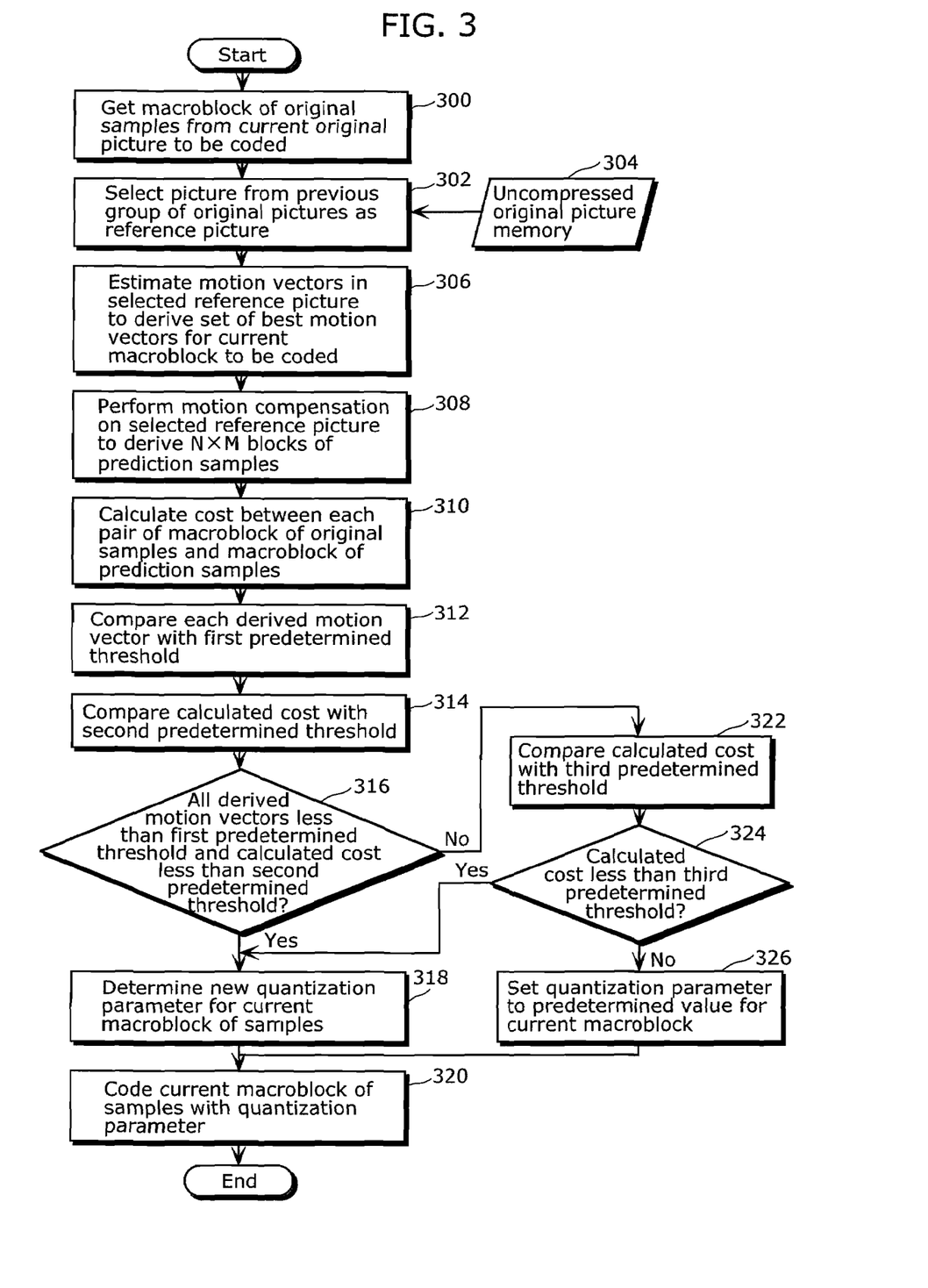
FIG. 3 is a flowchart showing an adaptive picture quality adjustment process in a first embodiment of the present invention.

FIG. 3 shows a flowchart of an adaptive picture quality adjustment process in a first embodiment of the present invention. As shown in the figure, a macroblock of uncompressed original samples is obtained from the current uncompressed original picture to be coded in a module 300.

Next, in a module 302, a reference picture is selected from a group of original pictures stored in a picture memory as shown in a module 304. A picture in this case can be referred to as a frame picture or a field picture. In one example of this embodiment, in the case where the current picture is a frame picture, the reference frame is selected based on the criteria that it is the reference frame picture temporally nearest the current picture. In the case where the current picture to be coded is a field picture, the nearest reference field picture having the same field parity is selected as the current field picture.

In a module 306, a motion estimation step is performed on the selected reference picture to derive a set of motion vectors of the macroblock of uncompressed original samples. Based on the derived motion vectors, a motion compensation step is performed in a module 308 to derive a macroblock of predicted samples.

In a module 310, a cost value is calculated based on an expression depending on the sum of absolute differences of: the sample values of the derived macroblock of prediction samples; and the macroblock of original samples. An example of expressions for calculating cost values (Cost) is provided below.

$$\text{Cost} = \text{SAD} + \text{Lambda} * MV\text{Cost} \qquad \text{[Expression 1]}$$

Here, SAD is a sum of absolute differences of the prediction samples and original samples, Lambda is a constant value and MVCost represents the cost component that is dependent on the derived motion vectors. Lambda can be a zero value, and in the case the MVCost component can be ignored.

In a module 312, the absolute values of the motion vectors derived from the module 306 are compared with a first predetermined threshold. For example, the first predetermined threshold is an integer. Next, in a module 314, the calculated cost from the module 310 is compared with a second predetermined threshold. For example, the second predetermined threshold is an integer.

In the case where the absolute values for all of the components of motion vectors are less than the first predetermined threshold and the calculated cost is less than the second predetermined threshold as shown in a module 316, a new quantization parameter is determined for the current macroblock as shown in a module 318. A quantization parameter controls the quantization step size.

In the case where the absolute value for any of the components of the motion vectors is not less than the first predetermined threshold or the calculated cost is not less than the second predetermined threshold (No in Step 316), the calculated cost is compared with a third predetermined threshold, in a module 322. For example, the third predetermined threshold is an integer.

In the case where the calculated cost is less than the third predetermined threshold in a module 324, a new quantization parameter is determined for the current macroblock, as shown in a module 318. Otherwise, the quantization parameter is set to a predetermined value for the current macroblock in a module 326. The current macroblock of original samples is then coded using image coding tools based on the quantization parameter in a module 320. Examples of such tools include a prediction tool, an orthogonal transform tool, a quantization tool and an entropy coding tool.

The adaptive picture quality adjustment process can be applied to macroblocks of both intra- and inter-predicted pictures. In the case where the adaptive picture quality adjustment process is applied to macroblocks of an intra-predicted picture only, the image coding tools used in the module 320 include a spatial prediction tool, an orthogonal transform tool, a quantization tool and an entropy coding tool. In the case where the adaptive picture quality adjustment process is applied to macroblocks of an inter-predicted picture, the image coding tools used for intra-macroblocks include a spatial prediction tool, an orthogonal transform tool, a quantization tool and an entropy coding tool. The image coding tools for inter-macroblocks include a temporal prediction tool, an orthogonal transform, a quantization tool and an entropy coding tool.

Figure 4:
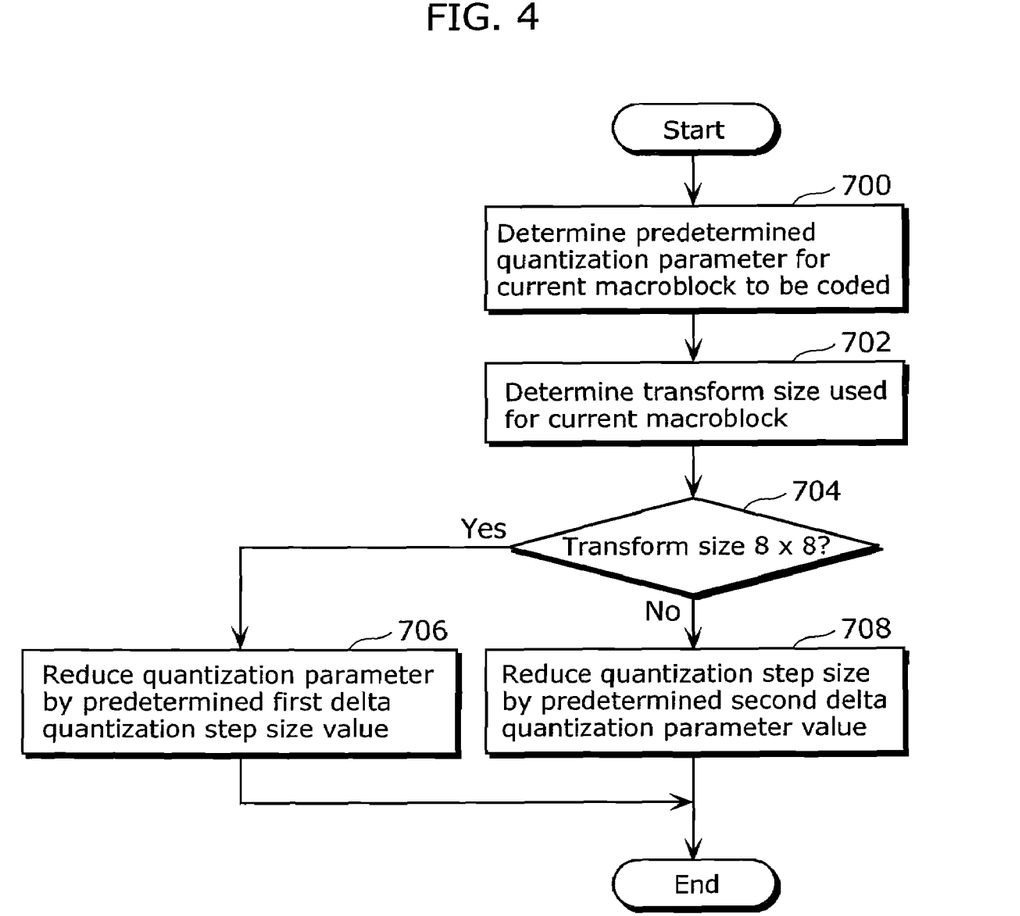
FIG. 4 is a flowchart showing an example of a process for setting quantization parameters in the present invention.

FIG. 4 is a flowchart showing an example of a process for determining a new quantization parameter in the present invention. Firstly, in a module 700, a predetermined quantization parameter is determined for a current macroblock. Next, in a module 702, the orthogonal transform size used for the current macroblock is determined. Examples of such orthogonal transforms include the 8×8 transform and the 4×4 transform. In this example, an N×N transform refers to transform of N samples in width by N samples in height. Here, N can be any integer. In a module 704, the determined transform size is compared with the size 8×8. In the case where the transform size is 8×8 in the module 704, the quantization parameter value is reduced by a predetermined first delta quantization parameter value in the module 706. In the case where the transform size is 4×4 instead of 8×8 in the module 702, the quantization parameter value is reduced by a predetermined second delta quantization parameter value in a module 708. Note that the orthogonal transform size is not limited to the sizes of 8×8 or 4×4, and the size may be other sizes of, for example, 16×16, 16×8, and 8×4.

In the example of FIG. 4, the number of orthogonal transforms available in an image coding process is two. In the case where only one orthogonal transform is available, the modules 702 and 704 are not needed and the quantization parameter value is reduced by a single predetermined delta quantization parameter value.

FIG. 4 shows a process for determining a new quantization parameter. However, in addition to such parameter for controlling a quantization step size, a quantization matrix may be used (parameters and matrixes are referred to as "quantization control variables" hereinafter).

Figure 5:
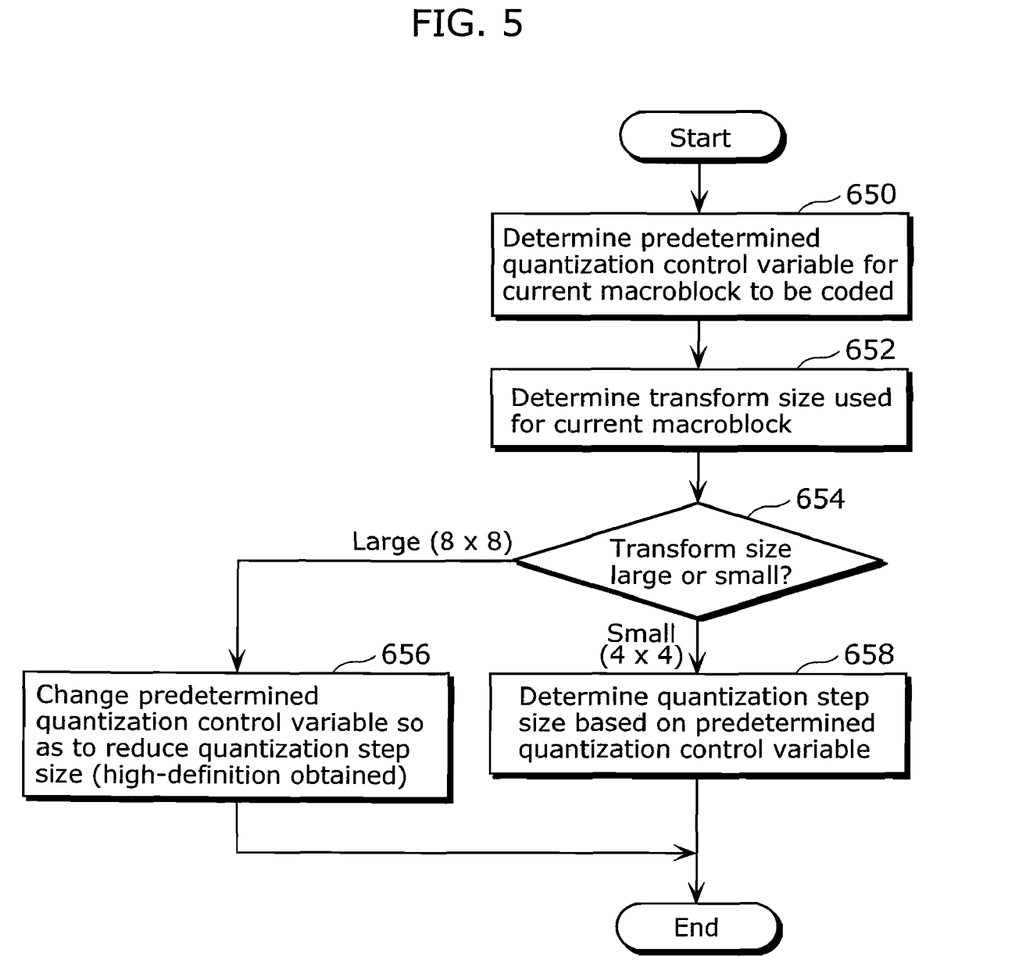
FIG. 5 is a flowchart showing an example of a process for setting quantization control variables in the present invention.

FIG. 5 is a flowchart showing an example of a process for determining a new quantization control variable in the present invention. A quantization matrix is used as the quantization control variable below.

First, in a module 650, a quantization matrix which is a predetermined quantization control variable is determined for the current macroblcok to be coded. Next, in a module 652, an orthogonal transform size to be used for the current macroblock is determined. Examples of such orthogonal transform size include an 8×8 transform and a 4×4 transform as in FIG. 4. Here, for example, the sizes of 16×16, 16×8, and 8×8 are regarded as large, and the sizes of 8×4, and 4×4 are regarded as small.

In a module 654, whether the determined transform size is large or small is judged. In the case where the transform size is judged to be large (Large in Step 654), the predetermined quantization control variable is changed so as to reduce the quantization step size, in a module 656. More specifically, in the case where the transform size is judged to be an 8×8 size in the module 654, each of the coefficients in the quantization matrix is reduced by each of the coefficients in a predetermined first delta quantization matrix in the module 656.

In the other case where the transform size is judged to be small (Small in Step 654), a quantization step size is determined based on the predetermined quantization control variable in a module 658. More specifically, in the case where the transform size is judged to be a 4×4 size in the module 654, each of the coefficients in the quantization matrix is reduced by each of the coefficients in a predetermined first delta quantization matrix in the module 658.

In the example of FIG. 5, the number of orthogonal transforms available in the image coding process is two. In the case where only one orthogonal transform is available, the modules 652 and 654 are not needed. Thus, each of the coefficients in the quantization matrix is reduced by each of the coefficients in the single predetermined delta quantization matrix.

Figure 6:
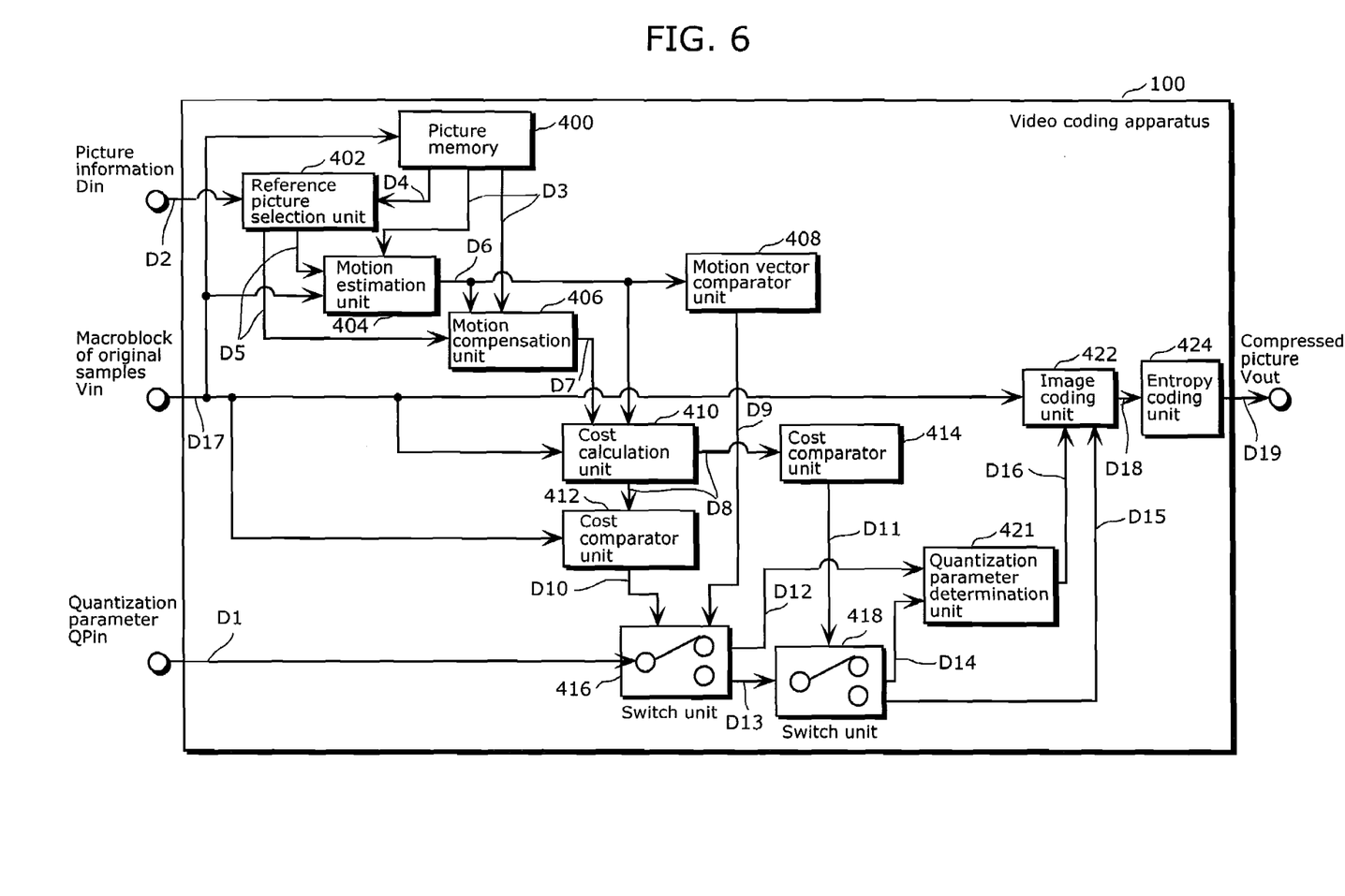
FIG. 6 is a block diagram showing the functional structure of an example of a video coding apparatus in the first embodiment of the present invention.

FIG. 6 shows a block diagram showing the functional structure of a video coding apparatus in a first embodiment of the present invention. This video coding apparatus 100 includes a picture memory 400, a reference picture selection unit 402, a motion estimation unit 404, a motion compensation unit 406, a motion vector comparator unit 408, a cost calculation unit 410, two cost comparator units 412 and 414, two switch units 416 and 418, a quantization parameter determination unit 421, an image coding unit 422, and an entropy coding unit 424.

The reference picture selection unit 402 receives current picture information D2 and reference picture information D4, selects a suitable reference picture based on the nearest temporal distance, and outputs a reference index D5 to the motion estimation unit 404. A macroblock of original samples D1 is received as an input Vin. The motion estimation unit 404 receives the macroblock of original samples D17, the reference index D5 and a reference picture D3. It outputs a set of motion vectors D6.

The motion vector comparator unit 408 takes the set of motion vectors D6, compares it with a first predetermined threshold, and outputs a signal D9. In the case where the absolute values for all of the components of motion vectors are less than the first predetermined threshold, a signal D9 is set to 1. Otherwise, the signal D9 is set to 0.

The motion compensation unit 406 then takes the reference index D5, the set of motion vectors D6 and a reference picture D3. It outputs a macroblock of prediction samples D7. The cost calculation unit 410 takes the macroblock of prediction samples D7, the macroblock of original samples D17 and the set of motion vectors D6. It outputs a cost value D8 to a cost comparator unit 412. The cost comparator unit 412 takes the cost value D8, compares it with a second predetermined threshold, and outputs a signal D10 to a switch unit 416. In the case where the calculated cost is less than the second predetermined threshold, a signal D10 is set to 1. Otherwise, the signal D10 is set to 0.

The switch unit 416 connects an output D12 to an input D1 or an output D13 to an input D1 depending on the signals D10 and D9. In the case where both signals D10 and D9 are 1, the output D12 is connected to the input D1. Otherwise, the input D13 is connected to the input D1 which is a predetermined quantization parameter QPin.

A cost comparator unit 414 takes the cost value D8, compares it with a third predetermined threshold, and outputs a signal D11 to a second switch unit 418. In the case where the calculated cost is less than the third predetermined threshold, a signal D11 is set to 1. Otherwise, the signal D11 is set to 0.

The switch unit 418 connects an output D14 to an input D13 or an input D15 to the input D13 depending on the signal D11. In the case where the signal D11 is 1, the output D14 is connected to the input D13. Otherwise, the input D15 is connected to the input D13.

The quantization parameter determination unit 421 takes either of the following inputs: a predetermined quantization parameter represented as either the output D14 or the output D12 whichever is signaled. In some implementations of the present invention, the predetermined size of the orthogonal transform to be used for the current macroblock is also inputted to the quantization parameter determination unit 421. The quantization parameter determination unit 421 then outputs a new quantization parameter D16 to the image coding unit 422. The image coding unit 422 takes the macroblock of original samples D17 and codes it using the quantization parameter value represented as either from the output D16 or the output D15 whichever is signaled, and outputs a macroblock of quantized residuals D18 to the entropy coding unit 424. Finally, the entropy coding unit 424 codes the N×M blocks of quantized residuals, and outputs the compressed bitstreams Vout.

While the video coding apparatus 100 of FIG. 6 includes a quantization parameter determination unit 421, the video coding apparatus 100 may be structured to include a quantization control variable determination unit instead of the quantization parameter determination unit 421 for the above-mentioned reason.

Figure 7:
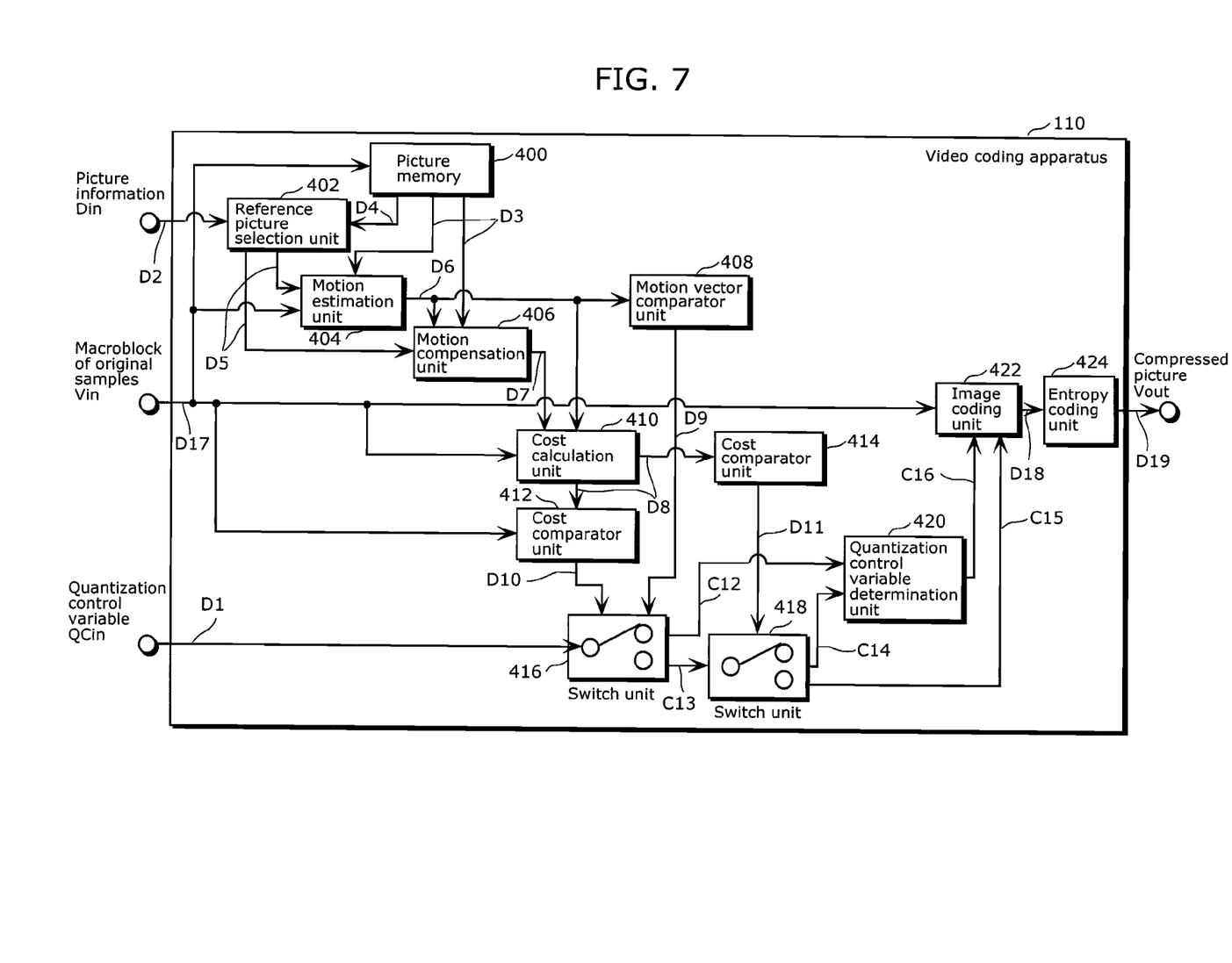
FIG. 7 is a block diagram showing the functional structure of an example of the video coding apparatus in the first embodiment of the present invention.

FIG. 7 is a block diagram showing a functional structure of a video coding apparatus including a quantization control variable determination unit. As shown in FIG. 7, the video coding apparatus 110 has the same structure as that of the video coding apparatus 100 of FIG. 6 except that the video coding apparatus 110 includes a quantization control variable determination unit 420 instead of the quantization parameter determination unit 421.

The quantization control variable determination unit 420 takes either of the following inputs: a predetermined quantization matrix represented as either a signal C14 or a signal C12. In some implements of the present invention, predetermined orthogonal transform sizes which are used for current macroblocks to be coded are also inputted into the quantization control variable determination unit 420. The quantization control variable determination unit 420 then outputs a new quantization matrix C16 to the image coding unit 422. The image coding unit 422 takes a macroblock of original samples D17 and codes it using a quantized matrix value represented as either the signal C16 or the signal C15. The image coding unit 422 outputs a macroblock of quantization residuals D18 to an entropy coding unit 424. Lastly, the entropy coding unit 424 codes N×M quantization residual blocks and outputs compressed bit streams Vout.

As described above, with the video coding apparatus of this embodiment of the present invention, it is possible to prevent pulsing noises because a current picture to be coded (specifically, a current macroblock to be coded) is coded with high resolution only when there is a high correlation between adjacent pictures (more specifically, between each pair of co-located macroblocks in the adjacent pictures).

Note that the cost calculation unit 410 and cost comparator units 412 and 414 are examples of correlation calculation units as in an aspect of the present invention.

(Second Embodiment)

The adaptive picture quality adjustment process includes two steps. The first step is to determine a correlation between a current macroblock of uncompressed original samples and samples of the preceding reconstructed pictures. The next step is to improve the coding quality of the current macroblock in the case where there is a high correlation between the current macroblock of uncompressed original samples and the samples of the preceding reconstructed pictures.

Figure 8:
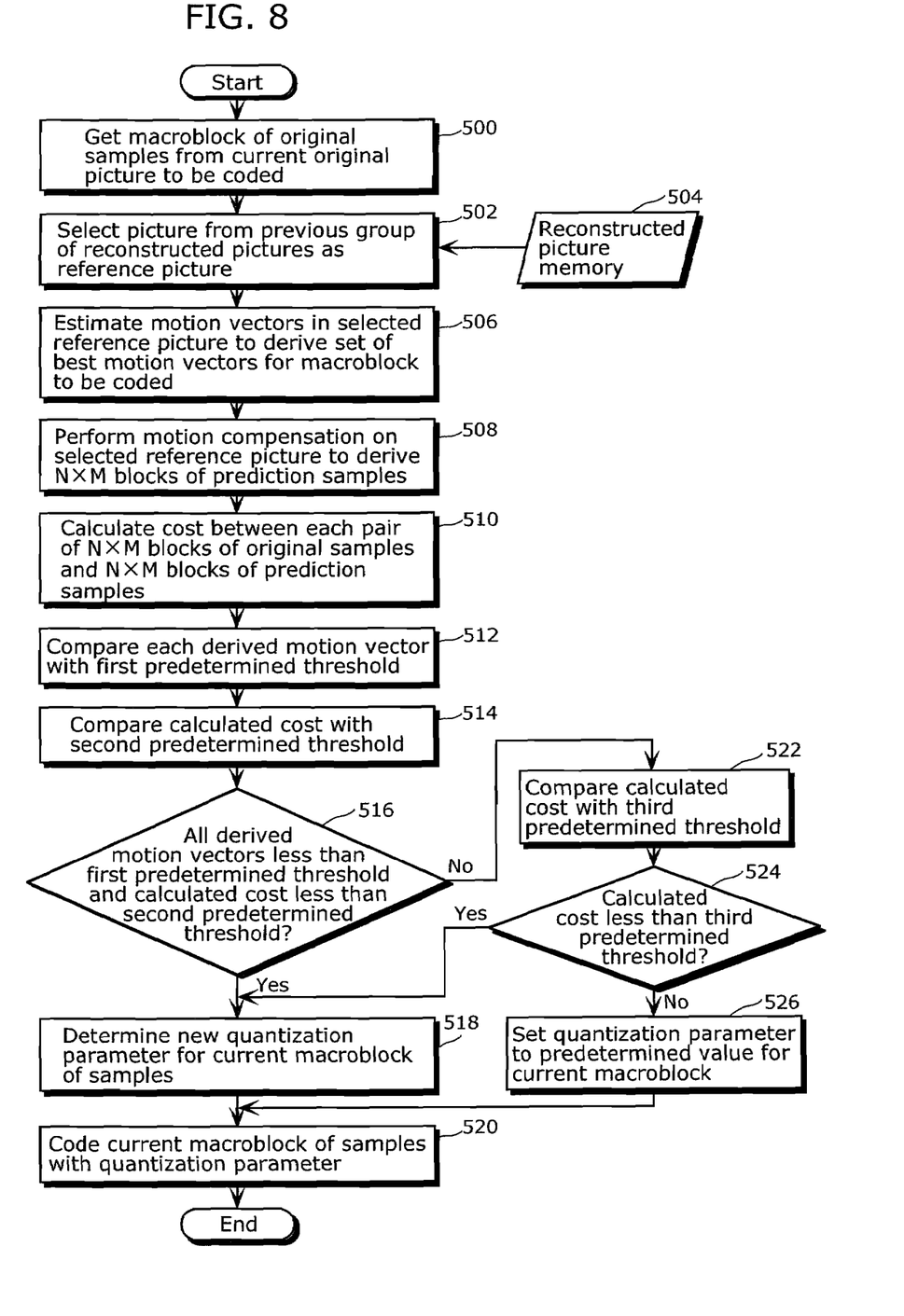
FIG. 8 is a flowchart showing an adaptive picture quality adjustment process in a second embodiment of the present invention.

The adaptive picture quality adjustment process of a second embodiment is the same as the process defined in the first embodiment except that the reference picture selection process, the motion estimation process and the motion compensation process in modules 502, 506 and 508, respectively, uses reconstructed pictures instead of uncompressed original pictures as reference pictures.

FIG. 8 shows a flowchart showing an adaptive picture quality adjustment process in the second embodiment of the present invention. As shown in the figure, a macroblock of uncompressed original samples is obtained from the current uncompressed original picture to be coded in a module 500.

Next, in a module 502, a reference picture is selected from a group of reconstructed pictures stored in a picture memory as shown in a module 504. A picture in this case can be referred to as a frame picture or a field picture. In one example of this embodiment, in the case where the current picture is a frame picture, the reference frame is selected based on the criteria that it is the reference frame picture temporally nearest to the current picture. In the case where the current picture is a field picture, the nearest reference field picture having the same field parity as that of the current field picture is selected.

In a module 506, a motion estimation step is performed on the selected reference picture to derive a set of motion vectors of the macroblock of uncompressed original samples. Based on the derived motion vectors, a motion compensation step is performed in a module 508 to derive a macroblock of predicted samples.

In a module 510, a cost value is calculated based on an expression depending on a sum of absolute differences of: the sample values of the derived macroblock of prediction samples; and the macroblock of original samples. An example of expressions for calculating cost values is provided below.

$$\text{Cost} = \text{SAD} + \text{Lambda} * MV\text{Cost} \qquad \text{[Expression 2]}$$

Here, SAD is a sum of absolute differences of the prediction samples and original samples, Lambda is a constant value and MVCost represents the cost component that is dependent on the derived motion vectors. Lambda can be a zero value, and in the case, the MVCost component can be ignored.

In a module 512, the absolute values of the motion vectors derived from the module 506 are compared with a first predetermined threshold. For example, the first predetermined threshold is an integer. Next, in a module 514, the calculated cost from the module 510 is compared with a second predetermined threshold. For example, the second predetermined threshold is an integer.

In the case where the absolute values for all of the components of motion vectors are less than the first predetermined threshold and the calculated cost is less than the second predetermined threshold, as shown in a module 516, a new quantization parameter is determined for the current macroblock as shown in a module 518. A quantization parameter controls the quantization step size.

In the case where the absolute value for any of the components of the motion vectors is not less than the first predetermined threshold or the calculated cost is not less than the second predetermined threshold, the calculated cost is compared with a third predetermined threshold. For example, the third predetermined threshold is an integer.

In the case where the calculated cost is less than the third predetermined threshold in a module 524, a new quantization parameter is determined for the current macroblock in the module 518. Otherwise, the quantization parameter is set to a predetermined value for the current macroblock in a module 526. The current macroblock of original samples is then coded using image coding tools based on the quantization parameter in a module 520. Examples of such tools include a prediction tool, an orthogonal transform tool, a quantization tool and an entropy coding tool.

The adaptive picture quality adjustment process can be applied to macroblocks of both intra- and inter-predicted pictures. In the case where the process applied to macroblocks of an intra-predicted picture only, the image coding tools used in the module 520 includes a spatial prediction tool, an orthogonal transform tool, a quantization tool and an entropy coding tool. In the case where the adaptive picture quality adjustment process is applied to macroblocks of an inter-predicted picture, the image coding tools used for intra-macroblocks include a spatial prediction tool, an orthogonal transform tool, a quantization tool and an entropy coding tool. The image coding tools for inter-macroblocks include a temporal prediction tool, an orthogonal transform, a quantization tool and an entropy coding tool.

FIG. 4 shows an example of the process to determine a new quantization parameter in the present invention. Firstly, in a module 700, a predetermined quantization parameter is determined for the current macroblock. Next, in a module 702, the orthogonal transform size used for the current macroblock is determined. Examples of such orthogonal transforms are the 8×8 transform and the 4×4 transform. In this example, an N×N transform refers to transform of N samples in width by N samples in height. Here, N can be any integer. In a module 704, the determined transform size is compared with the 8×8 size. In the case where the transform size is 8×8 in the module 704, the quantization parameter value is reduced by a predetermined first delta quantization parameter value in a module 706. In the case where the transform size is 4×4 for example, instead of 8×8 in the module 702, the quantization parameter value is reduced by a predetermined second delta quantization parameter value in a module 708.

In this example, the number of orthogonal transforms available in an image coding process is two. In the case where only one orthogonal transform is available, the modules 702 and 704 are not needed and the quantization parameter value is reduced by a single predetermined delta quantization parameter value.

Note that a quantization matrix may be determined as a new quantization control variable also in this embodiment as in the first embodiment.

Figure 9:
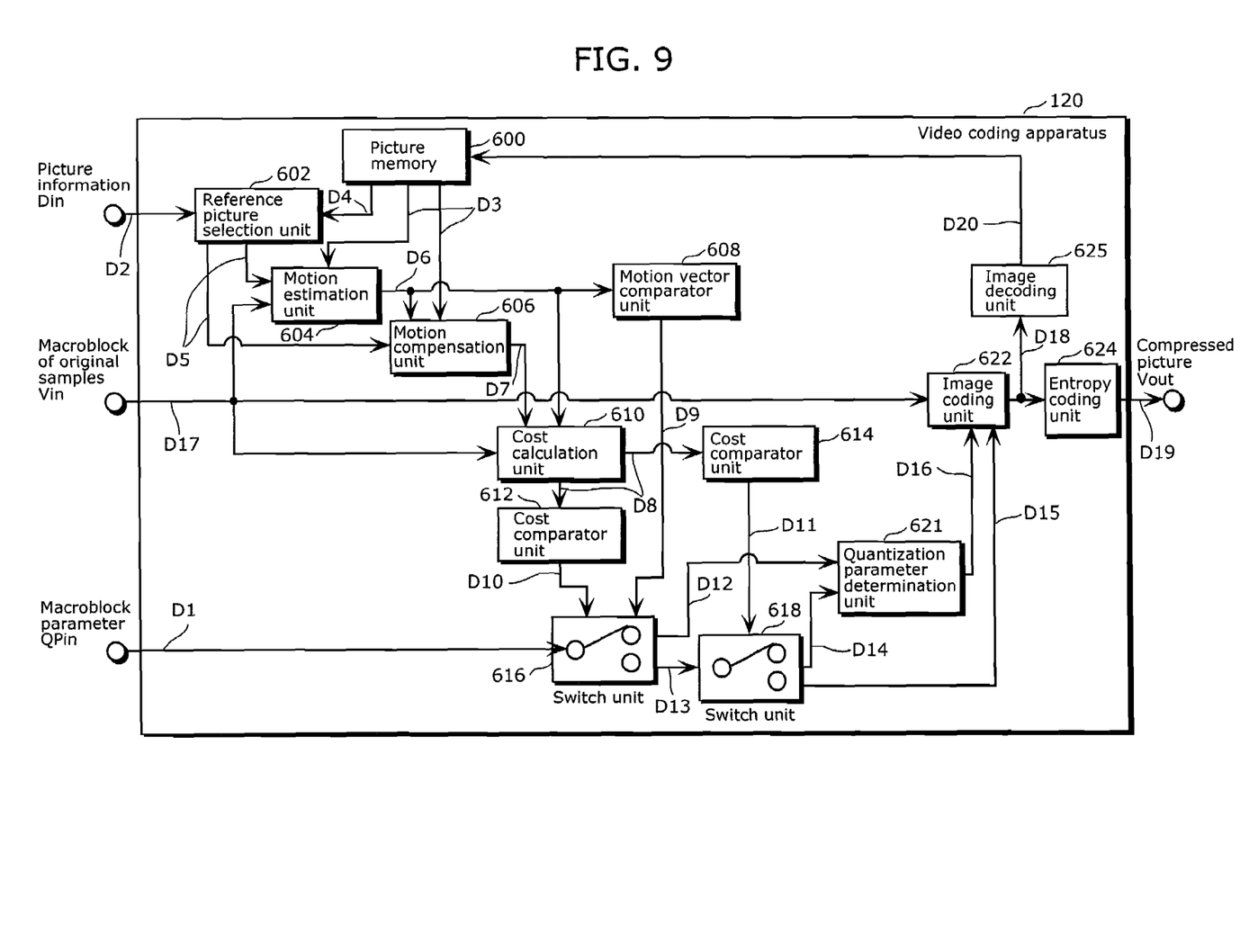
FIG. 9 is a block diagram showing the functional structure of an example of a video coding apparatus in the second embodiment of the present invention.

FIG. 9 shows a block diagram showing a functional structure of a video coding apparatus in the second embodiment of the present invention. The video coding apparatus 120 includes a picture memory 600, a reference picture selection unit 602, a motion estimation unit 604, a motion compensation unit 606, a motion vector comparator unit 608, a cost calculation unit 610, two cost comparator units 612 and 614, two switch units 616 and 618, a quantization parameter determination unit 621, an image coding unit 622, an image decoding unit 625, and an entropy coding unit 624.

The video coding apparatus 120 in the second embodiment is the same as that of the video coding apparatus 100 in the first embodiment except that the video coding apparatus 120 includes a picture memory 600 for containing reconstructed pictures instead of uncompressed original pictures and an additional image decoding unit 625 for reconstructing the compressed pictures.

The reference picture selection unit 602 receives current picture information D2 and reference picture information D4, selects a suitable reference picture based on the nearest temporal distance, and outputs a reference index D5 to the motion estimation unit 604. A macroblock of original samples D1 is received as an input Vin. The motion estimation unit 604 receives the macroblock of original samples D17, the reference index D5 and a reference picture D3. It outputs a set of motion vectors D6.

The motion vector comparator unit 608 takes the set of motion vectors D6, compares it with a first predetermined threshold, and outputs a signal D9. In the case where the absolute values for all of the components of motion vectors are less than the first predetermined threshold, a signal D9 is set to 1. Otherwise, the signal D9 is set to 0.

The motion compensation unit 606 then takes the reference index D5, the set of motion vectors D6 and a reference picture D3. It outputs a macroblock of prediction samples D7. The cost calculation unit 610 takes the macroblock of prediction samples D7, the macroblock of original samples D17 and the set of motion vectors D6. It outputs a cost value D8 to a cost comparator unit 612. The cost comparator unit 612 takes the cost value D8, compares it with a second predetermined threshold, and outputs a signal D10 to a switch unit 616. In the case where the calculated cost is less than the second predetermined threshold, a signal D10 is set to 1. Otherwise, the signal D10 is set to 0.

The switch unit 616 connects an output D12 to an input D1 or an input D13 to the input D1 depending on the signals D10 and D9. In the case where both signals D10 and D9 are 1, the output D12 is connected to the input D1. Otherwise, the input D13 is connected to the input D1 which is a predetermined quantization parameter QPin.

A cost comparator unit 614 takes the cost value D8, compares it with a third predetermined threshold, and outputs a signal D11 to a second switch unit 618. In the case where the calculated cost is less than the third predetermined threshold, a signal D11 is set to 1. Otherwise, the signal D11 is set to 0.

The switch unit 618 connects an output D14 to an input D13 or an output D15 to the input D13 depending on the signal D11. In the case where the signal D11 is 1, the output D14 is connected to the input D13. Otherwise, the input D15 is connected to the input D13.

The quantization parameter determination unit 621 takes either of the following inputs: a predetermined quantization parameter value represented as either D14 or D12 whichever is signaled. In some implementations of the present invention, the predetermined size of the orthogonal transform to be used for the current macroblock is also inputted to the quantization parameter determination unit 621. The quantization parameter determination unit 621 then outputs a new quantization parameter value D16 to the image coding unit 622. The image coding unit 622 takes the macroblock of original samples D17 and codes it using the quantization parameter value either from D16 or D15 whichever is signaled, and outputs a macroblock of quantized residuals D18 to the entropy coding unit 624. The entropy coding unit 624 then codes the N×M blocks of quantized residuals, and outputs the compressed bitstream Vout. Finally, the image decoding unit 625 takes the macroblock of quantized residuals D18 and reconstructs a macroblock of reconstructed samples D20 and stores into the picture memory 600. The reconstructed picture will be used as a reference picture in the motion estimation unit 604 and the motion compensation unit 606.

While the above-described first and second embodiments relate to video coding methods and video coding apparatuses, it should be noted that the corresponding video decoding methods and video decoding apparatuses can be also implemented. The video decoding apparatuses here each includes a control variable extraction unit which extracts a quantization control variable from coded image data and an image decoding unit which decodes the coded image data on the basis of quantization step size determined based on the extracted quantization control variable (and using a predetermined image decoding tool).

As described above, with the video coding apparatus of this embodiment, it is possible to prevent pulsing noises because a current picture to be coded (specifically, a current macroblock to be coded) is coded with high resolution only when there is a high correlation between adjacent pictures including reconstructed picture (more specifically, between each pair of co-located macroblocks in the adjacent pictures).

Industrial Applicability

The present invention is applicable to video coding apparatuses which code various multimedia data, and in particular to: video coding apparatuses and video coding methods for performing intra-coding; and the corresponding video decoding apparatuses and video decoding methods.

What is claimed is:

1. A video coding method of coding a video on a per predetermined block basis using one or more predetermined quantization control variables, said video coding method comprising:
    calculating a correlation degree indicating a correlation between an original block in a current original picture to be coded and a prediction block in a previous uncompressed picture, the correlation degree being calculated based on a difference between a sample value of the original block and a sample value of the prediction block, the correlation degree being greater as the original block and the prediction block are more similar to each other;
    changing a first predetermined quantization control variable to a second predetermined quantization control variable, so as to reduce a quantization step size when the correlation degree is greater than a predetermined threshold; and determining the quantization step size based on the second quantization control variable, and coding the original block based on the determined quantization step size using a predetermined image coding tool, wherein said changing includes:
    specifying, for the original block, a predetermined quantization parameter; determining an orthogonal transform size to be used for the original block; judging whether the orthogonal transform size is of a predetermined large size or a predetermined small size; and
    reducing a value of the predetermined quantization parameter by a predetermined first delta quantization parameter value, when the orthogonal transform size is judged to be the predetermined large size.

2. The video coding method according to claim 1, wherein said calculating includes calculating a correlation degree indicating a correlation between the original block in the current original picture to be coded and a prediction block in a previous reconstructed picture.

3. The video coding method according to claim 1, wherein said calculating includes:
    calculating a motion vector in the prediction block; and calculating a cost value indicating the correlation degree using: a sample value of the original block, a sample value of the prediction block, and the calculated motion vector, and wherein said changing includes changing the first quantization control variable to the second quantization control variable based on the calculated cost value.

4. The video coding method according to claim 1, wherein the predetermined image coding tool is used for coding an intra-macroblock.

5. The video coding method according to claim 1, wherein the predetermined image coding tool is used for coding an inter-macroblock.

6. The video coding method according to claim 1, wherein said determining and coding includes coding the second quantization control variable.

7. A video coding method of coding a video on a per predetermined block basis using one or more predetermined quantization control variables, said video coding method comprising:
    calculating a correlation degree indicating a correlation between an original block in a current original picture to be coded and a prediction block in a previous uncompressed picture, the correlation degree being calculated based on a difference between a sample value of the original block and a sample value of the prediction block, the correlation degree being greater as the original block and the prediction block are more similar to each other;
    changing a first predetermined quantization control variable to a second predetermined quantization control variable, so as to reduce a quantization step size when the correlation degree is greater than a predetermined threshold; and determining the quantization step size based on the second quantization control variable, and coding the original block based on the determined quantization step size using a predetermined image coding tool, wherein said changing includes:
    specifying, for the original block, a predetermined quantization matrix; determining an orthogonal transform size to be used for the original block; judging whether the orthogonal transform size is of a predetermined large size or a predetermined small size; and
    reducing each of coefficients in the predetermined quantization matrix by each of coefficients in a predetermined first delta quantization matrix, when the orthogonal transform size is judged to be the predetermined large size.

8. A non-transitory computer-readable recording medium having a program recorded thereon, the program for use with a video coding apparatus, which codes a video on a per predetermined block basis using one or more predetermined quantization control variables, the program, when loaded into the video coding apparatus, causing the video coding apparatus to execute a method comprising: calculating a correlation degree indicating a correlation between an original block in a current original picture to be coded and a prediction block in a previous uncompressed picture, the correlation degree being calculated based on a difference between a sample value of the original block and a sample value of the prediction block, the correlation degree being greater as the original block and the prediction block are more similar to each other;
    changing a first predetermined quantization control variable to a second predetermined quantization control variable, so as to reduce a quantization step size when the correlation degree is greater than a predetermined threshold; and determining the quantization step size based on the second quantization control variable, and coding the original block based on the determined quantization step size using a predetermined image coding tool, wherein said changing includes:

specifying, for the original block, a predetermined quantization parameter; determining an orthogonal transform size to be used for the original block; judging whether the orthogonal transform size is of a predetermined large size or a predetermined small size; and reducing a value of the predetermined quantization parameter by a predetermined first delta quantization parameter value, when the orthogonal transform size is judged to be the predetermined large size.

9. A video coding apparatus which codes a video on a per predetermined block basis using one or more predetermined quantization control variables, said video coding apparatus comprising:

a correlation calculation unit operable to calculate a correlation degree indicating a correlation between an original block in a current original picture to be coded and a prediction block in a previous uncompressed picture, the correlation degree being calculated based on a difference between a sample value of the original block and a sample value of the prediction block, the correlation degree being greater as the original block and the prediction block are more similar to each other;

a variable determination unit operable to change a first predetermined quantization control variable to a second predetermined quantization control variable, so as to reduce a quantization step size when the correlation degree is greater than a predetermined threshold; and an image coding unit operable to determine the quantization step size based on the second quantization control variable, and code the original block based on the determined quantization step size using a predetermined image coding tool, wherein said change includes:

specifying, for the original block, a predetermined quantization parameter; determining an orthogonal transform size to be used for the original block; judging whether the orthogonal transform size is of a predetermined large size or a predetermined small size; and reducing a value of the predetermined quantization parameter by a predetermined first delta quantization parameter value, when the orthogonal transform size is judged to be the predetermined large size.

10. An integrated circuit which codes a video on a per predetermined block basis using one or more predetermined quantization control variables, said integrated circuit comprising:

a correlation calculation unit operable to calculate a correlation degree indicating a correlation between an original block in a current original picture to be coded and a prediction block in a previous uncompressed picture, the correlation degree being calculated based on a difference between a sample value of the original block and a sample value of the prediction block, the correlation degree being greater as the original block and the prediction block are more similar to each other;

a variable determination unit operable to change a first predetermined quantization control variable to a second predetermined quantization control variable, so as to reduce a quantization step size when the correlation degree is greater than a predetermined threshold; and an image coding unit operable to determine the quantization step size based on the second quantization control variable, and code the original block based on the determined quantization step size using a predetermined image coding tool, wherein said change includes:

specifying, for the original block, a predetermined quantization parameter; determining an orthogonal transform size to be used for the original block; judging whether the orthogonal transform size is of a predetermined large size or a predetermined small size; and reducing a value of the predetermined quantization parameter by a predetermined first delta quantization parameter value, when the orthogonal transform size is judged to be the predetermined large size.

* * * * *